C. F. Woodruff,
Machine Gearing
N° 77,700.                     Patented May 5, 1868.
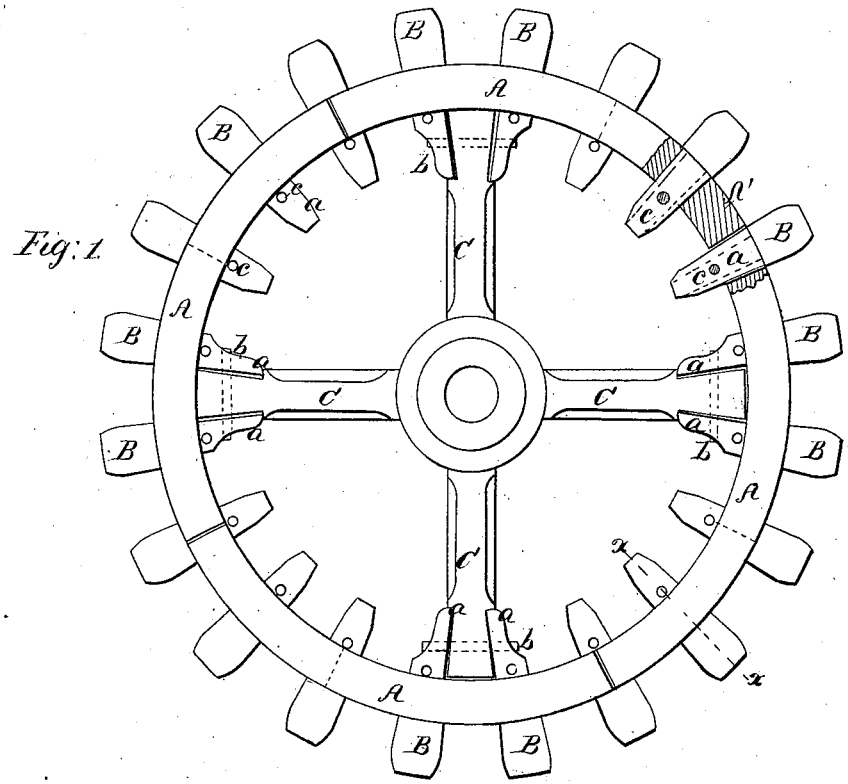
Fig: 1.
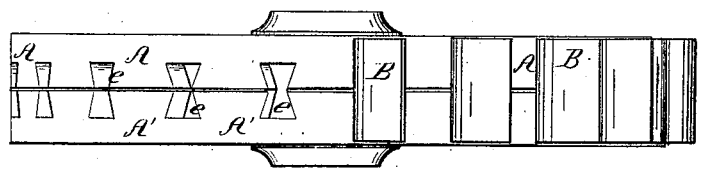
Fig: 2.
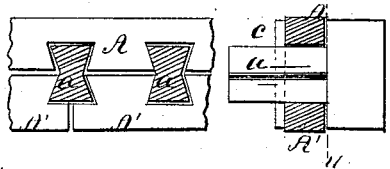
Fig: 4.     Fig: 3.
Witnesses;
Inventor,
C. F. Woodruff
per Munn & Co
Attorneys

United States Patent Office.

C. F. WOODRUFF, OF NEWBERN, TENNESSEE.

Letters Patent No. 77,700, dated May 5, 1868.

---

IMPROVEMENT IN SPUR-WHEELS.

---

The Schedule referred to in these Letters Patent and making part of the same.

---

TO ALL WHOM IT MAY CONCERN:

Be it known that I, C. F. WOODRUFF, of Newbern, in the county of Dyer, and State of Tennessee, have invented a new and useful Improvement in Spur-Wheels; and I do hereby declare that the following is a full, clear, and exact description thereof, which will enable those skilled in the art to make and use the same, reference being had to the accompanying drawings, forming part of this specification, in which—

Figure 1 represents a side view of my improved spur-wheel, with a portion of the sectional rim removed, showing the tenon of the cogs.

Figure 2 represents a face view, with some of the cogs removed, showing the double dove-tail mortise in the two sides of the sectional segments of the rim.

Figure 3 is a cross-section through the rim and cog, taken in the line $x\,x$, fig. 1.

Figure 4 is a section through the cogs, showing the double dove-tail tenons binding the sectional segments of the rim together.

Similar letters of reference indicate corresponding parts.

This invention relates to improvements in wooden (or cast-iron) spur-wheels, and consists in constructing the rim in sectional segments, cut in the plane of the wheel centrally, and having the ends of the segments lap, so as to break joints, which sectional segments are held together by means of the double dove-tail tenons or shanks on the cogs fitting in corresponding mortises in the two sections, and also in uniting the arms of the wheel to the rim by passing their ends between the inner or shank-ends of two contiguous cogs, forming a dove-tail connection, that is secured by bolts, as hereinafter more particularly described.

The rim of the wheel is formed in segments, A and A', which are laid side by side, so as to break joints, as shown clearly in all the drawings.

The cogs B B have their shanks $a\,a$ made in the form of a double dove-tail tenon, that fits in a corresponding mortise, $e$, made in the two sections of the rim, one half in each side, as shown clearly in fig. 2.

The cogs are keyed up by keys $c\,c$, through the shanks inside of the rim, in the usual way, which binds the side sections of the rim together, and the ends of the segments of the rim are made to abut in the centre of the mortise for the shanks of the cogs, so that they are also drawn and held together by the dove-tail tenon at the same time that the side sections are united by keying up the cogs.

The arms C C of the wheel are permanently united to the rim of the wheel by forming their ends in a dove-tail shape, which is fitted between the shanks $a\,a$ of two contiguous cogs B B, as shown clearly in fig. 1.

The shanks of the cogs are pinned fast to the arm by pins $b\,b$.

Having described my invention, I claim as new, and desire to secure by Letters Patent—

1. The rim of a spur-wheel, as constructed and cast in sectional segments A A', united and bound together by the double dove-tail shanks $a\,a$ of the cogs B B, in the manner herein described.

2. The double dove-tail shanks $a\,a$ of the cogs B B, in combination with the sectional segments A A', constructed, arranged, and operating substantially as and for the purpose described.

3. The combination of the arms C C, the shanks $a\,a$, the pins $b\,b$, and the sectional segment rim, constructed, arranged, and operating substantially as and for the purpose described.

C. F. WOODRUFF.

Witnesses:
   J. G. TUCKER,
   A. M. HARPER.